(12) United States Patent
Baker

(10) Patent No.: US 7,149,295 B2
(45) Date of Patent: Dec. 12, 2006

(54) TECHNIQUE FOR EFFECTIVELY CONTROLLING COMMUNICATION LINKS TO AN INFORMATION ASSISTANCE SERVICE

(75) Inventor: Nathan Bryant Baker, Tigard, OR (US)

(73) Assignee: Metro One Telecommunications, Inc., Beaverton, OR (US)

( * ) Notice: Subject to any disclaimer, the term of this patent is extended or adjusted under 35 U.S.C. 154(b) by 999 days.

(21) Appl. No.: 10/108,730

(22) Filed: Mar. 28, 2002

(65) Prior Publication Data

US 2003/0185374 A1 Oct. 2, 2003

(51) Int. Cl.
*H04M 15/00* (2006.01)
*H04M 3/00* (2006.01)
*H04M 5/00* (2006.01)

(52) U.S. Cl. .................. 379/121.01; 379/218.01; 379/265.01; 379/266.02; 379/266.1

(58) Field of Classification Search ............... 379/111, 379/114.01, 114.05, 115.01, 121.01, 126, 379/201.02, 201.05, 218.01, 265.01, 265.07, 379/265.11, 266.02, 266.1
See application file for complete search history.

(56) References Cited

U.S. PATENT DOCUMENTS

| | | | |
|---|---|---|---|
| 3,748,396 A | 7/1973 | Hestad et al. | |
| 3,833,768 A | 9/1974 | Scott | |
| 4,959,855 A | 9/1990 | Daudelin | |
| 5,339,352 A | 8/1994 | Armstrong et al. | |
| 5,479,495 A | 12/1995 | Blumhardt | |
| 5,797,092 A | 8/1998 | Cox et al. | |
| 5,809,121 A | 9/1998 | Elliott et al. | |
| 5,848,142 A | 12/1998 | Yaker | |
| 5,864,617 A | 1/1999 | Donnelly | |
| 5,873,032 A | 2/1999 | Cox et al. | |
| 5,930,338 A | 7/1999 | McKendry | |
| 5,943,417 A | 8/1999 | Cox et al. | |
| 5,960,004 A | 9/1999 | Ramstrom et al. | |
| 5,995,826 A * | 11/1999 | Cox et al. ................... | 455/417 |
| 6,002,760 A | 12/1999 | Gisby | |
| 6,009,161 A | 12/1999 | Babbitt et al. | |
| 6,035,190 A | 3/2000 | Cox et al. | |
| 6,058,178 A | 5/2000 | McKendry | |
| 6,078,580 A | 6/2000 | Mandalia et al. | |
| 6,111,873 A | 8/2000 | Mandalia et al. | |
| 6,111,940 A | 8/2000 | Kugell | |
| 6,173,051 B1 | 1/2001 | Lipchock et al. | |

(Continued)

FOREIGN PATENT DOCUMENTS

WO    WO 99/17520    10/1998

(Continued)

*Primary Examiner*—Binh K. Tieu
(74) *Attorney, Agent, or Firm*—Kaye Scholer LLP

(57) ABSTRACT

It is typical that a user calls an information assistance service provider to request information, e.g., a destination telephone number desired by the user, and chooses to be connected to the destination number. It is also typical that the information assistance service provider offers enhanced assistance service features, e.g., a StarBack feature. In prior art, to provide the enhanced service features, the user's call invariably continues to be connected to a servicing switch associated with the service provider after the user is connected to the destination number. To efficiently utilize the limited capacity of the servicing switch, in accordance with the invention, the user's call may be selectively released from the servicing switch before the call is connected to the destination number. Such a call release depends on certain criteria for determining whether the user is a candidate for utilizing an enhanced service feature after the call is connected to the destination number.

85 Claims, 3 Drawing Sheets

U.S. PATENT DOCUMENTS

| | | |
|---|---|---|
| 6,205,215 B1 | 3/2001 | Dombakly |
| 6,259,786 B1 | 7/2001 | Gisby |
| 6,279,038 B1 | 8/2001 | Hogan et al. |
| 6,289,088 B1 | 9/2001 | Bruno et al. |
| 6,801,763 B1 * | 10/2004 | Elsey et al. ............ 455/404.1 |
| 6,816,580 B1 * | 11/2004 | Timmins ............... 379/114.23 |
| 6,937,711 B1 * | 8/2005 | Baker .................... 379/114.12 |
| 6,985,569 B1 * | 1/2006 | Baker ......................... 379/126 |
| 2001/0012772 A1 | 8/2001 | Cox et al. |
| 2001/0012773 A1 | 8/2001 | Cox et al. |
| 2001/0014598 A1 * | 8/2001 | Cox et al. .................. 455/406 |
| 2001/0019604 A1 | 9/2001 | Joyce et al. |
| 2005/0129208 A1 * | 6/2005 | McGrath et al. ....... 379/218.01 |
| 2005/0136887 A1 * | 6/2005 | Pines et al. ................. 455/405 |
| 2005/0136899 A1 * | 6/2005 | Pines et al. .............. 455/414.1 |
| 2005/0136916 A1 * | 6/2005 | Pines et al. ................. 455/428 |
| 2005/0143064 A1 * | 6/2005 | Pines et al. ................. 455/428 |
| 2005/0288013 A1 * | 12/2005 | Pines et al. .............. 455/432.3 |

FOREIGN PATENT DOCUMENTS

| | | |
|---|---|---|
| WO | WO 99/59316 | 5/1999 |
| WO | WO 00/28720 | 9/1999 |
| WO | WO 00/44153 | 1/2000 |
| WO | WO 01/79967 | 4/2001 |
| WO | WO 01/80544 | 4/2001 |
| WO | WO 01/67731 | 5/2001 |

* cited by examiner

200

TECHNIQUE FOR EFFECTIVELY CONTROLLING COMMUNICATION LINKS TO AN INFORMATION ASSISTANCE SERVICE

FIELD OF THE INVENTION

The invention relates to a communications system and method, and more particularly to a system and method for controlling links switched to connect to an information assistance service.

BACKGROUND OF THE INVENTION

It is a common experience to use, e.g., a wireless or wireline telephone, to call an operator for information assistance. In a typical information assistance call, a caller identifies to the operator the name and address (sometimes city or area code) of a party whose telephone number is desired. In response, the operator locates the desired destination number using, e.g., a computer database. The destination number is then provided to the caller, e.g., by a computerized voice server which provides automated voicing of the number, and the caller is afforded an option to be connected to the destination number without the need of first terminating the information assistance call.

After exercising such an option, the caller may further take advantage of enhanced assistance service features during or after the connection to the destination number. For example, one such enhanced service feature, known as a "StarBack" feature, is described in U.S. Pat. No. 5,797,092 issued Aug. 18, 1998 to Cox et al. To realize the StarBack feature, the caller's connection is continually monitored for a predetermined DTMF signal, such as that obtained by pressing a "*" key by the caller, after the caller is connected to the destination number. If such a signal is detected, the caller is transferred back to an operator, who can then provide further assistance.

SUMMARY OF THE INVENTION

In providing the prior art information assistance service described above, the connection between the caller and the destination party is made through a servicing switch associated with the information assistance service provider. The connection from the caller's communication device to the servicing switch however occupies a port of the switch until the caller terminates the connection (i.e., the caller's device goes on-hook). Since the number of ports in a servicing switch is limited, the number of callers who can simultaneously access the information assistance service through the servicing switch is accordingly limited.

I appreciate the necessity of engaging the servicing switch when the caller is connected to the service provider to obtain information assistance, and when the caller is further connected by the service provider to a destination number if the caller needs to take advantage of an enhanced assistance service feature, e.g., the StarBack service feature. Nevertheless, I have recognized inefficient use of the limited capacity of the servicing switch in the prior art information assistance service. This inefficiency stems from the fact that in the prior art service, each caller who may or may not utilize an enhanced service feature is invariably connected through the servicing switch for the full duration of the caller's connection including any connection to a destination number.

Thus, in accordance with the invention, not every information assistance call is allowed to further engage the servicing switch after the initial information assistance is provided. Rather, when it is determined, based on certain criteria, that a caller is a candidate for using an enhanced assistance service feature, the call is allowed to continue to engage the servicing switch in anticipation of the provision of one such feature. Otherwise, the caller's call is released from the servicing switch as soon as the initial information assistance is provided even if the caller requests to be connected to a destination number. In that case, the call is released to a carrier switch from which the call was sent to the servicing switch. The servicing switch also provides, among others, the destination number information to the carrier switch for it to complete the caller's call to the destination number. The carrier switch then completes the call to the destination number.

Thus, in accordance with the invention, a user's call is received by the servicing switch through a link, e.g., a channel. The servicing switch may be used to further connect the call to a destination device associated with a destination telephone number desired by the user. However, in connecting the call to the destination device, a determination is made based on one or more criteria whether the call should continue to be connected to the switch through the link, thereby making available one or more features of the information assistance service after the call is connected to the destination device.

The aforementioned criteria may be established based on a user profile, wherein a user preference for utilizing the enhanced service features may be formulated based on personal information concerning the user. In addition, the criteria may be a function of usage by the user of the information assistance service. For example, the more often the user accesses the information assistance service, thereby earning a "premier user" status, the more likely the user's call not released from the servicing switch to conveniently make available to the user the enhanced service features throughout the call. Further, the criteria may be a function of a status of a user account, e.g., the account for billing the user's information assistance calls. If the user is delinquent in his/her account, the user is likely to be denied the enhanced service features. Still further, the criteria may be a function of a method of accessing the information assistance service, e.g., a calling card call vs. direct dialing. In addition, the access method may vary with the actual telephone number used to access the information assistance service. For example, calling a first telephone number to access the information assistance service enables the user to take advantage of the enhanced service features while calling a second telephone number to the same does not.

BRIEF DESCRIPTION OF THE DRAWINGS

Further objects, features and advantages of the invention will become apparent from the following detailed description taken in conjunction with the accompanying drawing showing an illustrative embodiment of the invention, in which.

DETAILED DESCRIPTION

Figure 1:
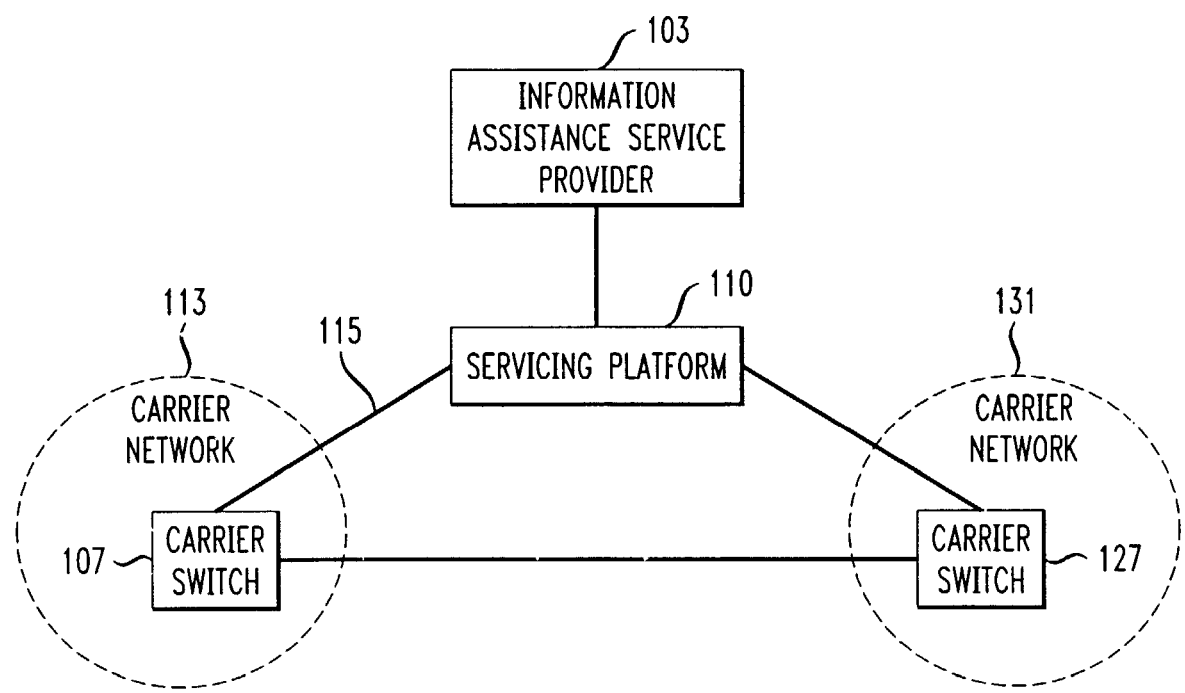
FIG. 1 illustrates a communications arrangement where an information assistance service is provided in accordance with the invention.

The invention is directed to providing an information assistance service to such users as wireline telephone, wireless telephone and other communications device users. FIG. 1 illustrates an information assistance service arrangement embodying the principles of the invention. In this illustrative arrangement, users of a particular telephone carrier may dial, speak or otherwise communicate predetermined access digits, access codes or retail numbers, or input a predetermined address or URL established by the carrier to access information assistance service provider 103. For example, the predetermined access digits may be "411," "*555," "555-1212," "00," etc. On learning one such access digit sequence initiated from a user's communications device, a switching system of the user's telephone carrier in a conventional manner routes the information assistance call to provider 103 through a carrier network. In this instance, carrier switch 107 in carrier network 113 switches the call to servicing platform 110, which is outside network 113 and associated with provider 103.

Figure 2:
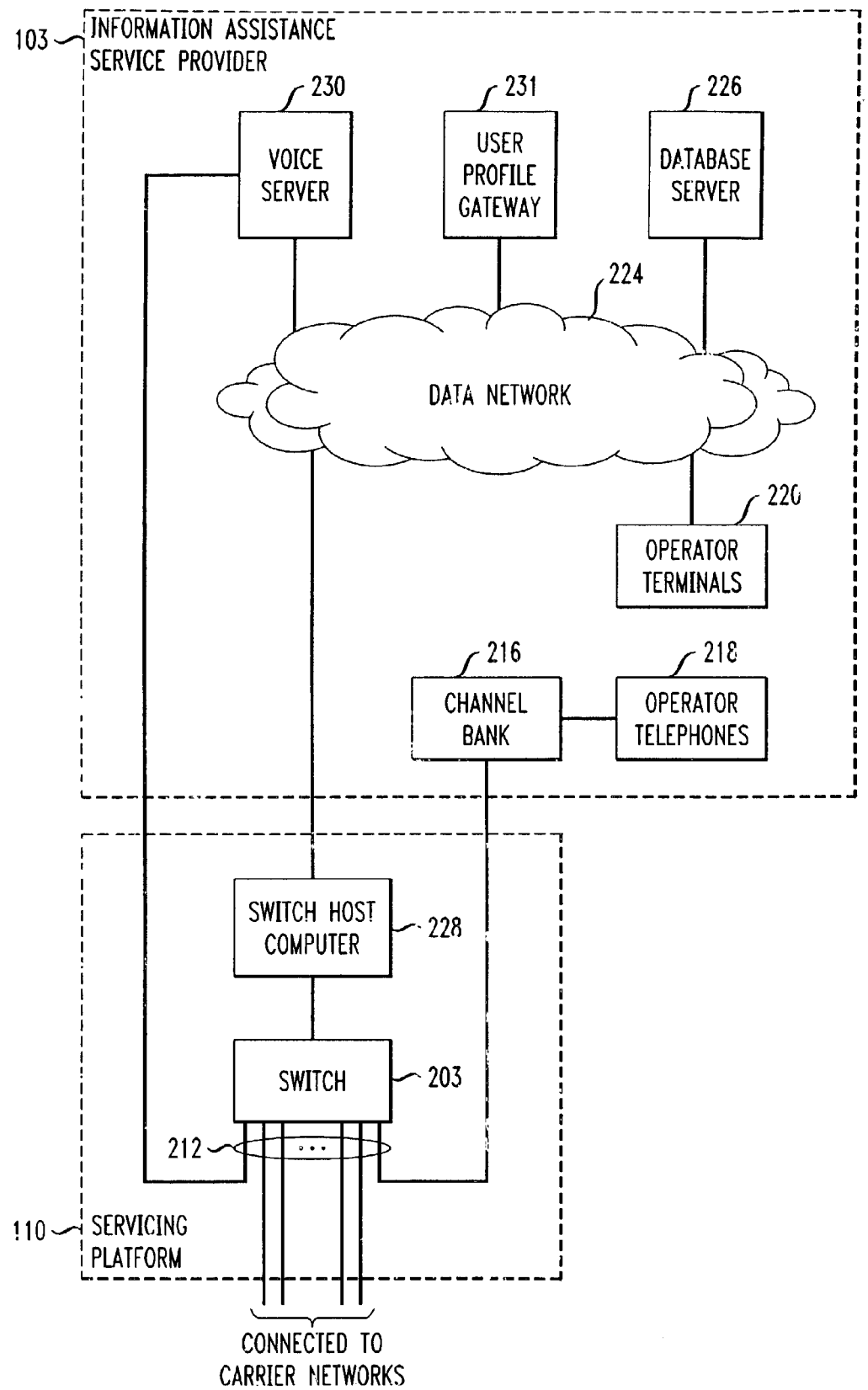
FIG. 2 illustrates an information assistance provider and a servicing platform for providing the information assistance service.

FIG. 2 illustrates information assistance service provider 103 together with servicing platform 110, hereinafter referred to collectively as "information assistance system 200." It should be noted that even though both provider 103 and servicing platform 110 appear in the same figure, they may or may not be located in the same geographic area. In FIG. 2, servicing platform 110 comprises servicing switch 203 having T1 spans 212 for connection to voice server 230, channel bank 216, and carrier networks including, e.g., carrier network 113. Switch 203 may receive an incoming information assistance call from one of the carrier networks through a carrier switch therein, e.g., carrier switch 107. It may also be used to place an outgoing call through one of the carrier networks which may be different than that used for the incoming call.

Channel bank 216 in provider 103 is used to couple multiple operator telephones 218 to switch 203. The operators in system 200 are further equipped with operator terminals 220, each of which includes a video display unit and a keyboard with associated dialing pad. Operator terminals 220 are connected over data network 224 to one or more database server(s) 226 (although only one is shown here). Switch host computer 228, voice server 230 and user profile gateway 231 are also connected to data network 224. By way of example, data network 224 includes a local area network (LAN) supplemented by a number of point-to-point data links. Through data network 124 and routers (not shown), components of system 200, may also be connected to the Internet.

Switch 203 is conventional and supports digital T1 connectivity. The operation of switch 203 is governed by instructions stored in switch host computer 228. In this illustrative embodiment, switch 203 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on system 200 and switch 203 for each corresponding function.

An incoming information assistance call from a user is received by switch 203 in system 200 which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 228 or elsewhere in system 200. In other instances, other distribution logic schemes may be utilized, such as skills-based routing or a priority scheme for preferred users.

Operators may utilize database server 226 to provide information assistance including searching for a user's desired party and determining the appropriate destination number of the party. Other information assistance concerning restaurant recommendations, movie listings, events, etc. may also be provided by searching database server 226.

Voice server 230 is used to play the constant repeated parts of an operator's speech, namely, the various greetings and signoffs (or closings). Voice server 230 is connected via data network 224 to switch host computer 228 and via one or more T1 spans to switch 203. Voice server 230 may comprise a general purpose computer and one or more voice cards for voice recognition, voice recording and playback, and call progress analysis. At appropriate stages in a call progression, switch host computer 228 initiates a voice path connection between voice server 230 and switch 203 such that the user, or the user and the operator, are able to hear whatever pre-recorded speech is played on that connection by voice server 230. Computer 228 then instructs voice server 230, via data network 224, what type of message to play, and passes data parameters that enable voice server 230 to locate the message appropriate to the call state.

Referring also to FIG. 1, the aforementioned information assistance call in this instance is switched by carrier switch 107 to servicing switch 203 via an inbound channel of one of T1 spans 212. The inbound channel or link 115 carrying the information assistance call engages an incoming port (not shown) of servicing switch 203.

By way of example, the user in the instant information assistance call identifies to an operator the name and address (sometimes city or area code) of a party whose telephone number is desired. In response, the operator locates the desired destination number using, e.g., database server 226. The user then chooses to be connected to the destination number without the need of first terminating the call.

In a prior art information assistance service, after the connection to the destination number is made for the user, enhanced assistance service features are afforded. For example, to realize one such enhanced service feature, known as a "StarBack" feature, the connection is continually monitored for a predetermined DTMF signal, such as that obtained by pressing a "*" key by the user, after the user is connected to the destination number. If such a signal is detected by servicing switch 203, the caller is transferred back to an operator, who can then provide further assistance. However, to provide the enhanced service features, inbound link 115 needs to be connected to an incoming port of servicing switch 203 until the user terminates the call (i.e., until the user's communication device goes on-hook) at which time switch 107 tears down inbound link 115. Thus, if the user's phone conversation with the destination party is X minutes long, the incoming port of switch 203 is occupied for at least X minutes, during which no incoming information assistance call can be received by provider 103 through such an incoming port. Since the number of incoming ports in servicing switch 203 is limited, the number of users who can simultaneously access the information assistance service through servicing switch 203 is accordingly limited.

I appreciate the necessity of engaging the servicing switch when the user is connected to the service provider to obtain information assistance, and when the user is further connected by the service provider to a destination number if the user needs to take advantage of enhanced assistance service features. Nevertheless, I have recognized use of the limited capacity of the servicing switch in the prior art information assistance service is inefficient, especially when the value of the aforementioned X is large. This inefficiency stems from the fact that in the prior art service, each user who may or may not utilize an enhanced service feature is invariably connected through the servicing switch for the full duration of the user's connection, including any connection to a destination number.

Figure 3:
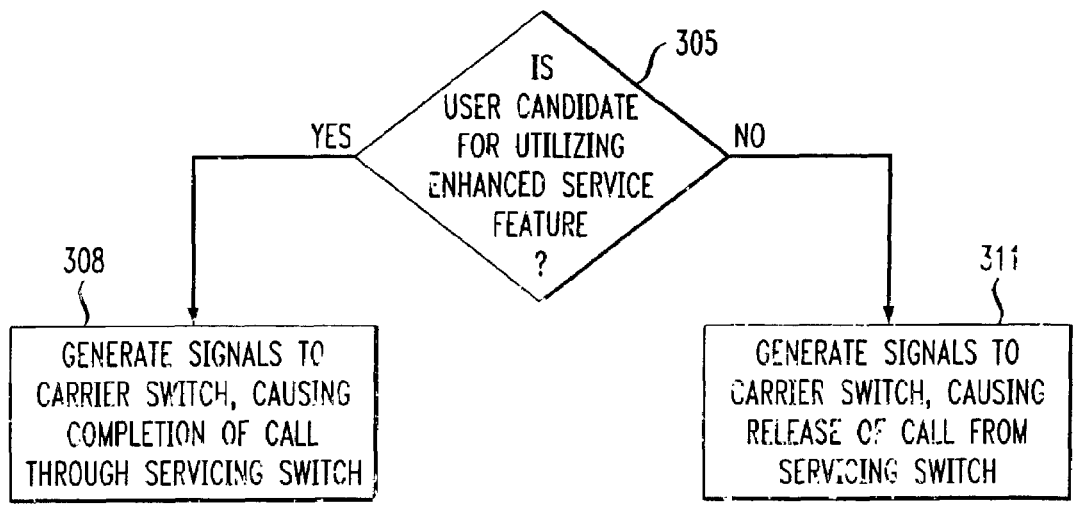
FIG. 3 is a flow chart depicting a routine for determining a release of a link to a servicing switch in the servicing platform in accordance with the invention.

Thus, in accordance with the invention, not every information assistance call is allowed to continue to utilize the capacity of the servicing switch after the initial information assistance is provided. Rather, for example, based on certain criteria described below, host computer 228 at step 305 in FIG. 3 determines whether the user is a candidate for utilizing an enhanced assistance service feature when the user requests to be connected to a destination number located by provider 103. If it is determined that the user is one such candidate, the call is allowed to continue to engage servicing switch 203 in anticipation of provision of an enhanced service feature. In that case, at step 308 host computer 228 generates signals to carrier switch 127 in carrier network 131, causing a completion of the user's call, through servicing switch 203, to a communication device associated with the destination number. These signals in accordance with a well known protocol contain, among others, a call completion command, and the destination number information from provider 103. In response to the received signals, carrier switch 127 in a conventional manner causes the user's call to the destination communication device to be completed. Thus, the user's call in this instance is completed through at least carrier switch 107, servicing switch 203 and carrier switch 127. As a result, servicing switch 203 continues to be connected to link 115. It should be noted at this point that carrier network 131 may or may not be the same network as carrier network 113.

Otherwise, if it is determined that the user is not a candidate for utilizing an enhanced service feature, the user's call, in accordance with the invention, is released from servicing switch 203 as soon as the initial information assistance is provided to the user, notwithstanding the fact that the user requests to be connected to a destination number. In that case, at step 311 host computer 228 generates signals to carrier switch 107 from which the information assistance call was received, causing a release of the call from servicing switch 203. These signals in accordance with a well known protocol contain, among others, a link release message, and the destination number information from provider 103. In response to the received signals, carrier switch 107 in a conventional manner tears down link 115, and reroutes the call to a communication device associated with the destination number. The call, thus rerouted, may be completed through carrier switch 127, however bypassing servicing switch 203, which thus is no longer connected to the call.

The criteria based on which host computer 228 at step 305 determines whether the user is a candidate for utilizing an enhanced assistance service feature will now be described. For example, these criteria may be based on (1) the method of service access, (2) actual access number dialed, (3) user profile, etc. In terms of (1), an enhanced service feature user-candidate may be distinguished from a non-candidate based on the way the user accesses information service provider 103. For instance, it may be specified by the carrier to which the user subscribes, or made known to a user beforehand (e.g., through advertisements, flyers, inserts in telephone bills, etc.) that certain methods of accessing service provider 103 preclude the user from taking advantage of an enhanced service feature. The service access methods may be distinguished from one another by their method of payment. For example, calling service provider 103 using a prepaid phone card may be considered a different access method than that using a calling card which extends credit to the user, both of which may be considered different than direct dialing. In the direct dialing case, the user is billed by the carrier for calling charges incurred by the user. Thus, for example, if the user has not authorized the carrier to bill for any enhanced assistance service features, accessing service provider 103 by direct dialing precludes the user from taking advantage of the enhanced service features. In that case, the user may have to resort to the prepaid phone card or calling card access method to take advantage of the features.

It should be noted at this juncture that in receiving an information assistance call from switch 107, servicing switch 203 also receives call set-up signals containing such data as the caller's automatic number identification (ANI) (i.e., the originating telephone number), a dialed number identification string (DNIS) for identifying the dialed telephone number, the area of the call's origination site, etc. It should also be noted that when a user makes an information assistance call using a calling card or prepaid phone card, the user typically dials initially a designated card service telephone number, e.g., 1-800-XXX-XXXX, to have the card information verified before the user can make the information assistance call. This designated card service telephone number is included in the DNIS data associated with the information assistance call received by servicing switch 203. Switch host computer 228 identifies from the received DNIS data any designated card service telephone number therein using a look-up table containing different designated card service numbers. When one such number is identified in the DNIS data, the corresponding card service utilized by the user is identified. Otherwise, the received DNIS data contains only the access number for provider 103, based on which computer 228 determines that the information assistance call was initiated by direct dialing. Alternatively, computer 228 may check the IDs of the trunk and span from which the information assistance service call comes, and which may be allocated for particular card service calls, to determine whether the call was made using a particular card service, In the example where the user has not authorized his/her carrier to bill for any enhanced assistance service features, when host computer 228 learns that the user accesses service provider 103 by direct dialing, host computer 103 at aforementioned step 305 determines that the user is a not a candidate for utilizing the enhanced service features. Accordingly, computer 103 at step 311 releases link 115, and thus the user's information assistance call, as soon as all of the user requests for information, e.g., a desired destination telephone number, are met. However, if it is determined that the user is an enhanced service feature user-candidate because of his/her otherwise access method, e.g., by using a prepaid phone card or calling card, computer 103 performs step 308 described above, instead.

An enhanced service feature user-candidate may also be distinguished from a non-candidate by the access number dialed to reach service provider 103. For example, through advertisements, flyers, inserts in telephone bills, etc., the user is informed beforehand that use of a first access number, e.g., 1010565, enables the user to reach provider 103 and take advantage of any enhanced assistance service features. On the other hand, use of a second access number, e.g., 1011000, enables the user to reach provider 103 for only an information assistance service with no enhanced service features. The user may be given an incentive to use the second access number to reach service provider 103 by offering, e.g., a lower information assistance service rate.

Based on the DNIS data received by switch 203, host computer 228 learns what access number (e.g., 1010565 vs. 1011000) the user dialed to access provider 103. Depending on the actual access number dialed, computer 228 decides whether to release link 115 after the user is provided with all requested information, in accordance with the routine of FIG. 3 described above.

Figure 5:
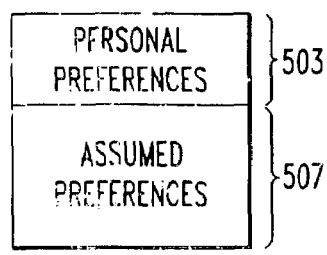
FIG. 5 illustrates a generic user profile.

In addition, an enhanced service feature user-candidate may also be distinguished from a non-candidate based on user profile information. In this illustrative embodiment, a user profile takes the form of a record, e.g., profile record 500 in FIG. 5, containing personal preferences 503 selected by the user, and assumed preferences 507 generated in a manner described below. Preferences 503 and preferences 507 in this instance include those preferences relating to use of enhanced assistance service features after an information assistance call. For example, personal preferences 503 may be specified by the user during telephone service registration with a carrier. Preferences 503 may be established by the user in response to such direct registration questions as "Do you want enhanced service features, e.g., . . . to be made available to you when you make an information assistance call?" The answers to such direct questions may be provided to system 200 to make up preferences 503.

Assumed preferences 505 may be derived from user personal information, information assistance service usage, account statuses, etc. User personal information includes information concerning the user's age, sex, profession, education, residence address, etc., which may be obtained during the aforementioned telephone service registration. Thus, for example, if the user is a young business executive who is presumed busy, he/she is more likely to use enhanced assistance service features which typically save time than someone who is retired. As a result, a positive vote would be cast for automatically making the enhanced service features available to the young business executive user.

Information assistance service usage may be determined by a billing subsystem (which may be part of system 200) for billing the carriers for their subscribers' use of the information assistance service by provider 103. In this illustrative embodiment, the billing subsystem keeps track of the number of information assistance calls received from each user, as part of the billing process. As mentioned before, each information assistance call received by system 200 is associated with an ANI. The number of calls is tracked by the billing subsystem for each ANI which corresponds to a different user. Statistics such as the volume of calls made by each user within a given period may be generated by the billing subsystem. In this example, the users whose call volumes exceed a predetermined volume threshold is accorded a "premier user" status. A premier user is preferentially treated, thereby earning a positive vote for automatically making the enhanced service features available to him/her.

Another statistic which may be generated by the billing subsystem is the frequency of use of an enhanced service feature by each user. To that end, the billing subsystem determines the percentage of information assistance calls made by a user in a given period which involves use of at least one enhanced service feature. In this example, the users whose percentage exceeds a predetermined percentage threshold is accorded a "frequent enhanced feature user" status. It is assumed that a frequent enhanced feature user is very likely to use repeatedly enhanced features in future information assistance calls, thereby earning a positive vote for automatically making the enhanced features available to him/her.

However, if a user who has an account delinquent history, e.g., who has telephone charges in arrears for a predetermined period, as a business preference, a negative vote for automatically making the enhanced features available to him/her may be cast. In this instance, the user account information may be provided by the user's carrier which actually bills the user for information assistance services.

In this illustrative embodiment, the assumed preference concerning use of an enhanced service feature is determined based on the votes corresponding to different factors (e.g., personal information, usage and account status) described above. For example, a positive vote is given a +1 value while a negative vote is given a −1 value. A weight can be accorded to a vote value to amplify or attenuate the corresponding factor. Indeed, a zero weight will discount the corresponding factor totally. An assumed preference for enhanced service features is accorded to the user in preferences 507 when the sum of the weighted vote values exceeds a predetermined threshold.

If a personal preference is in conflict with an assumed preference, the personal preference in this instance controls. However, it will be appreciated that such a conflict may be resolved in other ways.

Personal profile record 500 is identified by the user's telephone number and managed by a profile manager described below. Referring back to FIG. 2, an information assistance call is received by servicing switch 203 in information assistance system 200. In a well known manner, switch 203 derives, from the call set-up signals associated with the call, an ANI indicating the telephone number of the communication device from which the call originates. Host computer 228 then requests any user profile identified by such an ANI from gateway 231 connected to data network 224.

Figure 4:
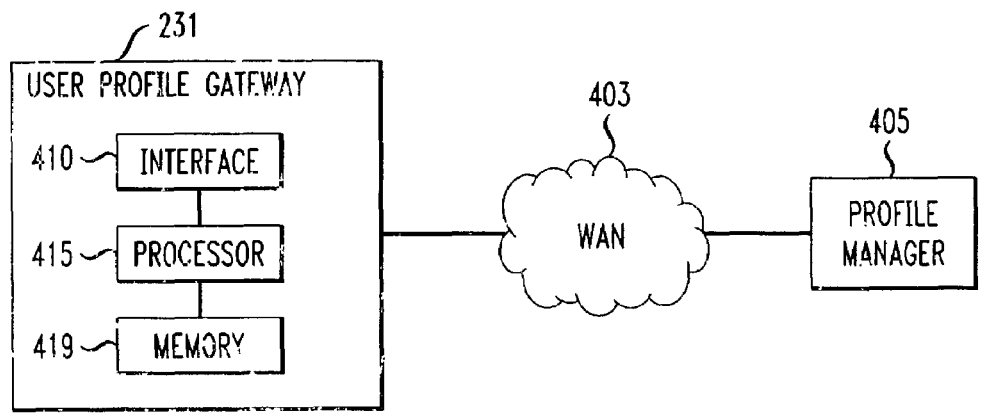
FIG. 4 illustrates a user profile gateway in the information assistance provider connected to a profile manager managing user profiles.

Referring also to FIG. 4, gateway 231 receives the profile request including the ANI from data network 224 through interface 410. In response to such a request, processor 415 searches memory 419 for the profile identified by the ANI. It should be noted at this point that all profile data is input and updated through profile manager 405. Copies of the profile data are distributed by manager 405 to the profile gateways in various information assistance systems through wide area network (WAN) 403. In this illustrative embodiment, a master copy of the profiles is kept at manager 405. For example, profile gateway 231 initially forwards requests for new profiles to manager 405, and caches copies of the requested profiles from manager 405 in local memory 419 for rapid, subsequent retrieval of the profiles. Memory 419 here generically includes disks, caches, and volatile and nonvolatile memories. When a particular profile in gateway 231 is updated at manager 405, the latter notifies gateway 231 that the particular profile is expired.

Thus, continuing the above example, if processor 415 determines that the requested profile cannot be found in memory 419 or the requested profile is expired, processor 415 forwards the profile request to manager 405 through interface 410. In response, manager 405 provides to gateway 231 any latest profile identified by the ANI. Otherwise, processor 415 retrieves from memory 419 any available, unexpired profile identified by the ANI.

The foregoing merely illustrates the principles of the invention. It will thus be appreciated that those skilled in the art will be able to devise numerous other arrangements which embody the principles of the invention and are thus within its spirit and scope.

For example, in the illustrative embodiment, profile gateway 231 needs to communicate in real time with profile manager 405 each time when a requested profile is unavailable or expired in memory 419. In an alternative embodiment, to avoid such real time communications with manager 405, thereby saving the response time, a copy of each profile in profile manager 405 is also stored in the profile gateways in all of the information assistance systems, including profile gateway 231. Whenever a change is made to a profile in manager 405, the latter immediately communicates the change to each profile gateway to ensure that each gateway has the current set of profiles, identical to the master set in manager 405. Nonetheless, this "copy-all" approach is disadvantageous in that it requires more local memory capacity to store a larger profile database in each gateway.

In addition, the invention equally applies regardless of whether feature group D (FGD) type signaling, SS7 out-of-band signaling or other signaling is used for communications between switches in the arrangement of FIG. 1.

Further, the term "operator" used herein broadly encompasses entities that are capable of providing information assistance in a communication environment, including without limitation human operators, voice response/recognition capabilities, web- or WAP-enabled operator services, and other electronic access.

Finally, information assistance system 200 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for use in a system for providing an information assistance service, the system including a switch, comprising:
    receiving a call from a user, the call being connected to the switch;
    connecting the call to a communications device associated with a destination telephone number desired by the user; and
    determining based on one or more criteria whether the call should continue to be connected to the switch in connecting the call to the communications device, thereby making available one or more features of the information assistance service after the call is connected to the communications device.

2. The method of claim 1 further comprising searching a database for the destination telephone number.

3. The method of claim 1 wherein the one or more criteria are established based on a profile of the user.

4. The method of claim 3 wherein the profile includes a preference for utilizing the one or more features.

5. The method of claim 4 wherein the preference is formulated based on at least personal information concerning the user.

6. The method of claim 5 wherein the personal information includes an age of the user.

7. The method of claim 5 wherein the personal information includes a profession of the user.

8. The method of claim 3 further comprising storing the profile in association with a telephone number of the user.

9. The method of claim 1 wherein the one or more criteria are a function of usage by the user of the information assistance service.

10. The method of claim 9 wherein the usage concerns the number of calls by the user to access the information assistance service over a period.

11. The method of claim 9 wherein the usage concerns a proportion of the calls by the user to access the information assistance service over a period which involves use of the one or more features.

12. The method of claim 1 wherein the one or more criteria are a function of a status of an account of the user.

13. The method of claim 12 wherein the account includes an account for billing the user for the information assistance service.

14. The method of claim 1 wherein the one or more criteria are a function of a way of accessing the information assistance service.

15. The method of claim 14 wherein the way of accessing depends on a method of payment for the call.

16. The method of claim 15 wherein the method of payment involves a prepaid account.

17. The method of claim 15 wherein the method of payment involves a credit account.

18. The method of claim 14 wherein the way of accessing includes direct dialing.

19. The method of claim 12 wherein the way of accessing includes calling a selected telephone number.

20. The method of claim 19 wherein the selected telephone number corresponds to an information assistance service with provision of the one or more features.

21. The method of claim 17 wherein the selected telephone number corresponds to an information assistance service without provision of the one or more features.

22. The method of claim 1 wherein the one or more features includes a StarBack feature.

23. A method for use in a system for providing an information assistance service, the system including a switch, the method comprising:
    receiving a call from a user through a connection to the switch;
    offering one or more features of the information assistance service which involve the connection;
    connecting the call to a communications device associated with a destination telephone number desired by the user; and
    determining based on one or more criteria whether the connection should be released before the call is connected to the communications device, thereby terminating offering the one or more features.

24. The method of claim 23 wherein the connection includes a communication channel.

25. The method of claim 23 wherein the connection includes a communication link.

26. The method of claim 23 wherein the one or more criteria are established based on a profile of the user.

27. The method of claim 26 wherein the profile includes a preference for utilizing the one or more features.

28. The method of claim 27 wherein the preference is formulated based on at least personal information concerning the user.

29. The method of claim 28 wherein the personal information includes an age of the user.

30. The method of claim 28 wherein the personal information includes a profession of the user.

31. The method of claim 27 further comprising storing the profile in association with a telephone number of the user.

32. The method of claim 23 wherein the one or more criteria are a function of usage by the user of the information assistance service.

33. The method of claim 32 wherein the usage concerns the number of calls by the user to access the information assistance service over a period.

34. The method of claim 32 wherein the usage concerns a proportion of the calls by the user to access the information assistance service over a period which involves use of the one or more features.

35. The method of claim 23 wherein the one or more criteria are a function of a status of an account of the user.

36. The method of claim 35 wherein the account includes an account for billing the user for the information assistance service.

37. The method of claim 23 wherein the one or more criteria are a function of a way of accessing the information assistance service.

38. The method of claim 37 wherein the way of accessing depends on a method of payment for the call.

39. The method of claim 38 wherein the method of payment involves a prepaid account.

40. The method of claim 38 wherein the method of payment involves a credit account.

41. The method of claim 37 wherein the way of accessing includes direct dialing.

42. The method of claim 37 wherein the way of accessing includes calling a selected telephone number.

43. The method of claim 42 wherein the selected telephone number corresponds to an information assistance service with provision of the one or more features.

44. The method of claim 43 wherein the selected telephone number corresponds to an information assistance service without provision of the one or more features.

45. The method of claim 23 wherein the one or more features includes a StarBack feature.

46. A system for providing an information assistance service, the system comprising:
   a switch for receiving a call from a user, the call being connected to the switch;
   an interface for receiving a request for connecting the call to a communications device associated with a destination telephone number desired by the user; and
   a control unit responsive to the request for selectively continuing to connect the call to the switch, based on one or more criteria, to provide one or more features of the information assistance service.

47. The system of claim 46 wherein the interface includes an operator.

48. The system of claim 46 wherein the one or more criteria are established based on a profile of the user.

49. The system of claim 48 wherein the profile includes a preference for utilizing the one or more features.

50. The system of claim 49 wherein the preference is formulated based on at least personal information concerning the user.

51. The system of claim 48 further comprising a memory for storing the profile in association with a telephone number of the user.

52. The system of claim 46 wherein the one or more criteria are a function of usage by the user of the information assistance service.

53. The system of claim 52 wherein the usage concerns the number of calls by the user to access the information assistance service over a period.

54. The system of claim 52 wherein the usage concerns a proportion of the calls by the user to access the information assistance service over a period which involves use of the one or more features.

55. The system of claim 46 wherein the one or more criteria are a function of a status of an account of the user.

56. The system of claim 46 wherein the one or more criteria are a function of a way of accessing the information assistance service.

57. The system of claim 56 wherein the way of accessing depends on a method of payment for the call.

58. The system of claim 57 wherein the method of payment involves a prepaid account.

59. The system of claim 57 wherein the method of payment involves a credit account.

60. The system of claim 56 wherein the way of accessing includes direct dialing.

61. The system of claim 56 wherein the way of accessing includes calling a selected telephone number.

62. The system of claim 61 wherein the selected telephone number corresponds to an information assistance service with provision of the one or more features.

63. The system of claim 61 wherein the selected telephone number corresponds to an information assistance service without provision of the one or more features.

64. The system of claim 46 wherein the one or more features includes a StarBack feature.

65. A system for providing an information assistance service, the system comprising:
   a switch for receiving a call from a user through a connection to the switch, one or more features of the information assistance service being offered which involve the connection;
   an interface for receiving a request for connecting the call to a communications device associated with a destination telephone number desired by the user; and
   a control unit responsive to the request for selectively releasing the connection based on one or more criteria before the call is connected to the communications device to terminate offering the one or more features.

66. The system of claim 65 wherein the connection includes a communication channel.

67. The system of claim 65 wherein the connection includes a communication link.

68. The system of claim 65 wherein the interface includes an operator.

69. The system of claim 65 wherein the one or more criteria are established based on a profile of the user.

70. The system of claim 69 wherein the profile includes a preference for utilizing the one or more features.

71. The system of claim 70 wherein the preference is formulated based on at least personal information concerning the user.

72. The system of claim 69 further comprising a memory for storing the profile in association with a telephone number of the user.

73. The system of claim 65 wherein the one or more criteria are a function of usage by the user of the information assistance service.

74. The system of claim 73 wherein the usage concerns the number of calls by the user to access the information assistance service over a period.

75. The system of claim 73 wherein the usage concerns a proportion of the calls by the user to access the information assistance service over a period which involves use of the one or more features.

76. The system of claim 65 wherein the one or more criteria are a function of a status of an account of the user.

77. The system of claim 65 wherein the one or more criteria are a function of a way of accessing the information assistance service.

78. The system of claim 77 wherein the way of accessing depends on a method of payment for the call.

79. The system of claim 78 wherein the method of payment involves a prepaid account.

80. The system of claim 78 wherein the method of payment involves a credit account.

81. The system of claim 77 wherein the way of accessing includes direct dialing.

82. The system of claim 77 wherein the way of accessing includes calling a selected telephone number.

83. The system of claim 82 wherein the selected telephone number corresponds to an information assistance service with provision of the one or more features.

84. The system of claim 82 wherein the selected telephone number corresponds to an information assistance service without provision of the one or more features.

85. The system of claim 65 wherein the one or more features includes a StarBack feature.

* * * * *